(12) United States Patent
Heide

(10) Patent No.: US 8,186,923 B2
(45) Date of Patent: May 29, 2012

(54) CONNECTING ARRANGEMENT AND METHOD OF FASTENING A BOLT

(75) Inventor: Denis Heide, Münster (DE)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 12/797,860

(22) Filed: Jun. 10, 2010

(65) Prior Publication Data

US 2011/0268530 A1    Nov. 3, 2011

(51) Int. Cl.
*F16B 37/08* (2006.01)

(52) U.S. Cl. ........................................ 411/433; 411/267

(58) Field of Classification Search .................. 411/360, 411/365, 266, 267, 432–434
See application file for complete search history.

(56) References Cited

U.S. PATENT DOCUMENTS

| | | | | | |
|---|---|---|---|---|---|
| 3,334,536 | A | * | 8/1967 | Armstrong | 411/434 |
| 3,361,460 | A | * | 1/1968 | Gerhart | 403/16 |
| 5,112,176 | A | * | 5/1992 | McCauley et al. | 411/432 |
| 5,613,816 | A | * | 3/1997 | Cabahug | 411/433 |
| 5,800,108 | A | * | 9/1998 | Cabahug | 411/433 |
| 2007/0175128 | A1 | * | 8/2007 | McCallion | 52/223.13 |

* cited by examiner

*Primary Examiner* — Gary Estremsky
(74) *Attorney, Agent, or Firm* — Global Patent Operations; Douglas D. Zhang

(57) ABSTRACT

A connecting arrangement is provided. The connecting arrangement includes a bolt with a fastening portion at one end thereof, which has one or more grooves; a cotter having a conical shape and one or more convex cuts on the inner side of the cotter adapted for fitting with the one or more grooves of the fastening portion of the bolt; two support blocks, each having a thread on the outer side, wherein at least one of them is on the inner side adapted for fitting to the conical shape of the cotter; and a fastener having a thread on the inner side, wherein the fastener is adapted for being screwed on the support blocks.

20 Claims, 5 Drawing Sheets

CONNECTING ARRANGEMENT AND METHOD OF FASTENING A BOLT

BACKGROUND OF THE INVENTION

The present application relates to a connecting arrangement and a method of fastening a bolt. More specifically, the present application relates to a connecting arrangement and a connecting system with improved fatigue resistance and to a method for fastening a bolt with improved fatigue resistance.

Fastening connections often use form closure in order to provide a tight connection between two or more different parts. Such fastening connections can be provided by screws, nails, bolts, rivets or the like. The function of these connections is to ensure a secured or fixed fitting of the connected parts and to transmit forces that are applied to the connected parts.

Especially screw connections are a common and popular manner to provide a good connection result at a minimum of costs. Therefore, screws are available for almost every connection of technical interest. For instance, flange connections are screwed in order to connect two approximately round components.

Typically, the screws have to provide a good and secure function in order to avoid any damage from separated components. Especially in very large applications, such as wind energy systems, the screw connection has to meet high security demands. The flange connections of wind energy systems are also screwed and the required strength is achieved by using large screws. Due to the construction and the material, which may be exposed to high loads, there is always a remaining risk for these connections. Furthermore, the dimensioning of the screws is in any technical case a compromise between security and costs.

BRIEF DESCRIPTION OF THE INVENTION

In view of the above, a connecting arrangement, a connecting system and a method of fastening a bolt are provided.

According to a first aspect of the present application, a connecting arrangement is provided. The connecting arrangement includes a bolt with a fastening portion having one or more grooves whose circumference is differentiable between at least two portions; a cotter having at least two parts and having a conical shape on the outer side and a axial bore when the at least two parts are put together, wherein the axial bore provides one or more convex cuts on the inner side of the bore, wherein the convex cuts are adapted for fitting with the one or more grooves of the fastening portion of the bolt; at least one first support block having a thread on the outer side; at least one second support block having a thread on the outer side, wherein at least one second support block is on the inner side adapted for fitting to the conical shape of the cotter; and a fastener having a thread on the inner side, wherein the fastener is adapted for being screwed on the support blocks.

According to another aspect of the present application, a connecting system for a flange connection is provided. The connecting system includes a bolt with a fastening portion at one end thereof adapted for fitting with a cotter, wherein the fastening portion has one or more grooves adapted for providing a stress-relieved geometry; a cotter adapted for clamping the bolt, wherein the cotter has one or more protrusions on the inner side of the cotter and a conical shape on the outer side of the cotter, wherein the one or more protrusions are adapted for fitting with the one or more grooves of the fastening portion of the bolt; at least one first thread block having a thread on the outer side; at least one second thread block having a thread on the outer side and a conical shape on the inner side, wherein the inner side is adapted for fitting with the conical shape of the cotter; and a nut having a thread on the inner side, wherein the nut is adapted for being screwed on the at least first thread block by fitting with the thread on the outer side of the first thread block and being adapted for locking the at least one second thread block so that a form closure is between the at least one first thread block and the cotter is provided.

According to yet another aspect of the present application, a method for fastening a bolt is provided. The method includes providing a bolt with a fastening portion at one end thereof, which has one or more grooves and a holding portion; surrounding the holding portion of the bolt with a first thread block having a thread on the outer side; surrounding the bolt with a second thread block having a thread on the outer side and a conical shape on the inner side; surrounding the fastening portion of the bolt having one or more grooves with a cotter having one or more convex cuts on the inner side of the cotter adapted for fitting with the one or more grooves of the fastening portion of the bolt; and fastening the bolt, the first and the second thread block, and the cotter with a nut having a thread on the inner side adapted for matching the thread of the first and the second thread block.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

The strength of a screw connection depends on different conditions. Among these conditions, there are material, size, order of assembly, load, location etc. Due to the geometry of the screw, screws allow on the one hand for a tight connection and on the other hand may cause notch stress. The notch stress appears in devices with a notched geometry. Notches with a sharp change in geometry (such as threads and the like) cause stress peaks in a device, when the device is stressed by tension, bending, torsion, and/or shear. These stress peaks reduce the strength of the device and may shorten the life time.

The notch stress may constitute a weak point of a screw-nut connection. With the addition of further factors, such as material weakness, the notch stress may have severe consequences. Therefore, screws have to be dimensioned in an adequate manner and the size of the screws to be used has to be increased for ensuring a proper function. Otherwise, the life cycle of the screws is shortened and the screws may have to be exchanged more often. The exchange of screws may result in high costs, especially because screw connections may be accessible only with considerable effort within a machine.

Threads for instance have sharp notches. Sharp notches cause high fatigue in bolts having threads. Further, sharp notches influence the load transmission through the thread in a negative manner. Consequently, a crack may occur during the lifetime of the bolt having a thread, beginning at the sharp notch in the thread. The crack may progress and may result in total bolt loss.

The connecting arrangement of the present application avoids these problems and provides an arrangement capable of reducing the notch stress. Thus, the present application provides a bolt-nut connection with improved fatigue behavior. The bolt-nut connections in the connecting arrangement and the connecting system according to embodiments described herein have a modified geometry, which helps to increase the resistance of the bolt regarding fatigue and may therefore increase the life cycle and the security of the connection compared to a screw connection as known in the art. The strength of the connecting arrangement of the present application becomes possible by providing two different threads to fasten the arrangement.

The terms "connecting arrangement" and "connecting system" are used synonymously throughout this disclosure.

Figure 1:
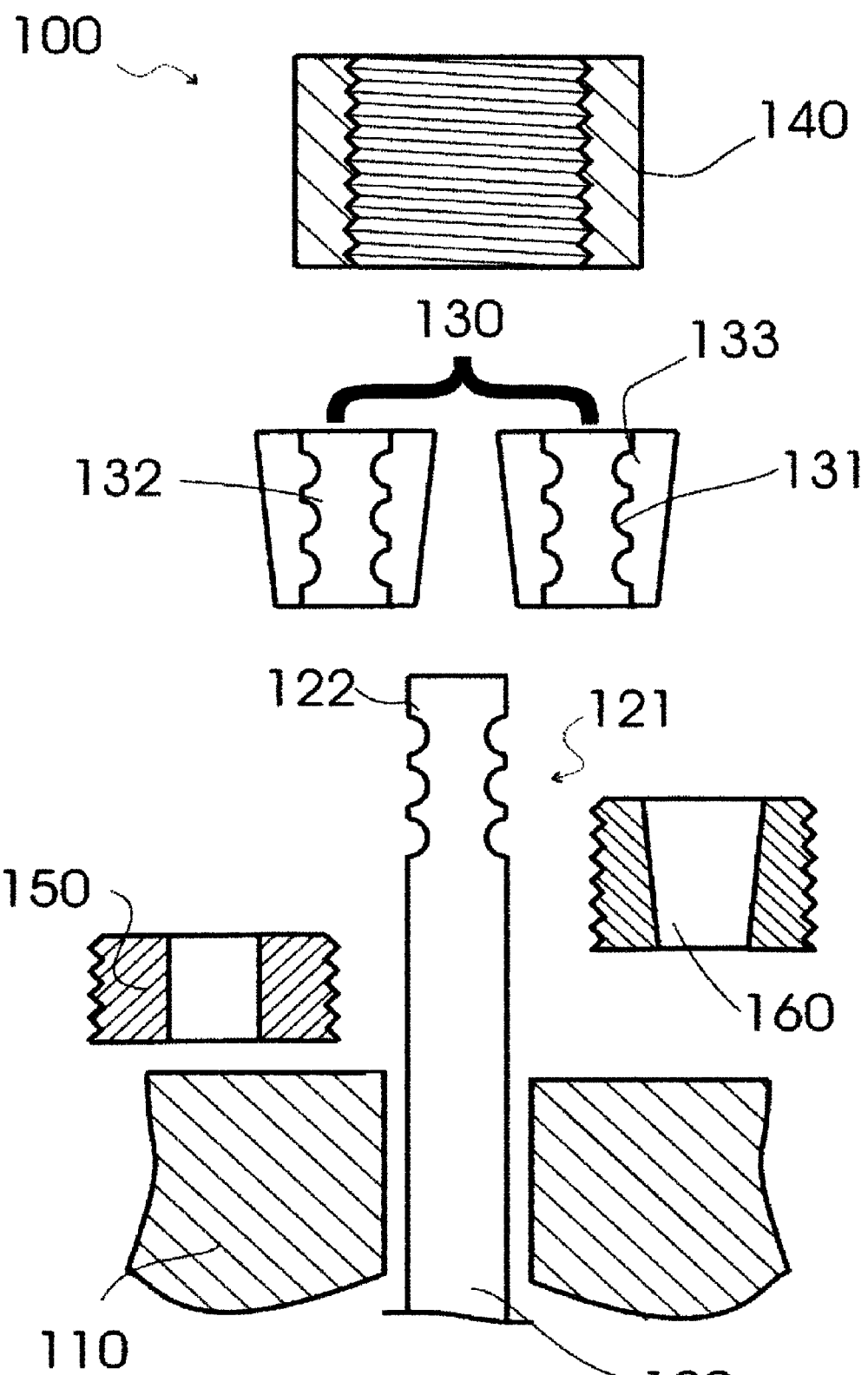
FIG. 1 shows a schematic, exploded view of a connecting arrangement according to embodiments described herein.

A connecting arrangement 100 according to embodiments described herein is shown in FIG. 1. The connecting arrangement 100 includes a bolt 120. The bolt is placed in a device 110, which has to be connected. A device may be a plate, a flange or the like. In one embodiment, at least one end of the bolt has a fastening portion 121.

According to some embodiments, the fastening portion 121 may have grooves 122 with a defined geometry. Typically, these grooves 122 have a stress-relieved geometry. For instance, these grooves 122 do not have acute angles, sharp corners or the like as the sharp notches of a thread do. However, a thread contains grooves with angles sharp enough to form notches. In contrast thereto, the geometry of grooves should be understood as a recess with a substantially smooth geometry. For instance, the grooves may have the shape of a segment of a circle. According to some embodiments, the grooves 122 may have a shape, which combines different geometric figures continuously. Thus, the geometry of the grooves 122 is designed so that the load transmission is substantially continuous and approximately constant over the cross section of the bolt 120.

Typically, an improved load transmission can be described as an improvement of the load distribution over the cross section of a device. For instance, a bolt with grooves may provide an improved load transmission compared to a bolt with a thread on it, because the grooves have a certain shape, which prevents stress peaks to appear. An improved load transmission is, for instance, characterized by smooth changes of the stress amount. No sharp corner, peaks or the like appear in the distribution of stress.

The improved load transmission may be provided by a stress-relieved geometry of the grooves 133 of the fastening portion 121 of bolt 120. The stress-relieved geometry may be described as a geometry, which has no abrupt changes.

Typically, the stress-relieved geometry, which causes a reduced notch stress, is differentiable between at least two portions. According to some embodiments, the stress-relieved geometry is substantially continuously differentiable. Substantially continuously differentiable should be understood as being continuously differentiable in a certain range, for instance in the dimension of the groove itself. That is, small variances due to production processes or material characteristics should not be regarded as preventing the geometry of the groove from being continuously differentiable. Also, a geometry having a variation, whose size is for instance $\frac{1}{20}$, $\frac{1}{10}$ or even $\frac{1}{5}$ the size of the groove should nevertheless be understood as continuously differentiable.

A stress-relieved geometry may reduce the notch stress in a bolt 120. The notch stress of the bolt 120 with stress-relieved geometry may be reduced compared to a bolt having sharp notches and dents or a geometry which is not differentiable between at least two portions.

Further, the connecting arrangement 100 provides a cotter 130. According to some embodiments, the cotter 130 is divided in at least two parts. Typically, the cotter 130 provides an axial bore and an essentially conical shape, when the single parts of the cotter are put together. The cotter 130 provides one or more convex cuts 133 on the inner side of the axial bore. Typically, the convex cuts 133 of the cotter fit with the grooves 122 of the fastening portion 121 of the bolt 120 in size and shape.

According to some embodiments, the cotter 130 may be a clamp component, which clamps the bolt in a predetermined position.

According to some embodiments described herein, the cotter 130 may be divided in two parts for mounting purposes. The two parts can be seen as first part of the cotter 131 and second part of the cotter 132 in FIG. 1.

According to other embodiments, the cotter may be divided in more than two parts, for instance the cotter may have three, four, five, or more than five parts.

According to some embodiments, the cotter is made from one piece of material and is divided after the inner and the outer sides have the predetermined geometry. For instance, one piece of material gets a conical shape on the outer side and convex cuts on the inner side. After that, the piece of material is cut (e.g., with any convenient method or the aid of a laser or a jet cutting method).

According to some embodiments, a first support block 150, and a second support block 160 are provided, each having a thread on the outer side. The first support block 150 has a predetermined geometry on the inner side, which fits with the geometry of the bolt 120. The other support block, second support block 160, has a predetermined geometry on the inner side fitting with the outer side of the cotter 130.

Typically, the two support blocks have opposite directed threads. Typically, the first support block 150 has a thread being oppositely directed compared to the thread of the second support block 160. That means, if the first support block 150 has a left-hand thread, the second support block 160 has a right-hand thread or otherwise around. With this arrangement, the support blocks 150, 160 rotate in opposite directions, when they are snugged down by the same fastener 140.

According to some embodiments described herein, the shape of the outer side of the cotter 130 can be chosen arbitrarily, as long as it fits with the geometry of an inner side of a support block.

According to some embodiments described herein, the connecting arrangement 100 may be provided for a flange 110. Flange connections are used in connecting, for instance, a pipe flange, where two pipes are connected to each other. Another application of a flange connection is the connection of two beams. Typically, the connecting arrangement described herein is adapted for being used in a wind energy system.

According to yet further embodiments, the flange 110 may be part of a wind energy system. For instance, a flange connection may be used in a wind energy system to lock the tower of the wind energy system to the ground.

As can be seen in FIG. 1, a fastener 140 is provided. The fastener 140 has a thread on the inner side, which is adapted for fitting with the threads on the outer side of support blocks 150, 160. Further, the fastener has an inner diameter, which allows the fastener 140 to fasten the support blocks 150, 160.

According to some embodiments, the fastener may be a nut or the like. The nut is adapted for fastening the support blocks 150, 160 to the bolt 120 and the cotter 130. Therefore, the fastener 140 can be screwed around support blocks 150, 160.

Figure 2:
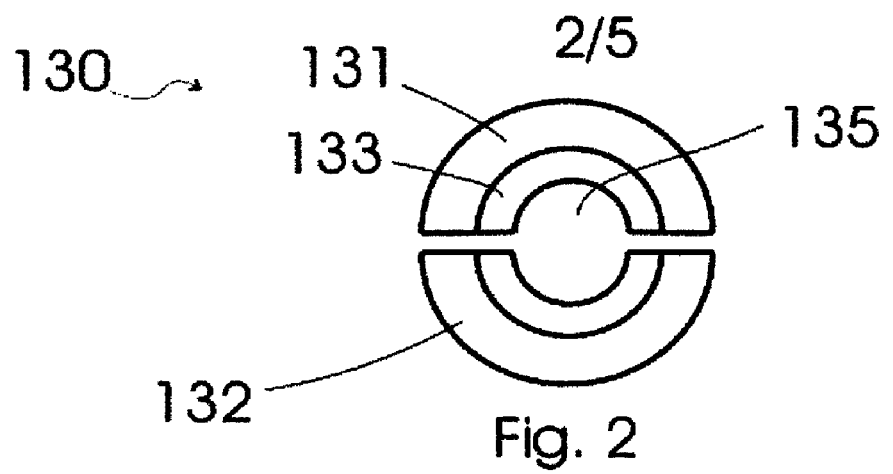
FIG. 2 shows a schematic top view of the cotter according to embodiments described herein.

In FIG. 2, the cotter 130 is shown in a top view, according to some embodiments. The cotter 130 is divided into two parts 131 and 132 in this embodiment. Each of the parts of the cotters 131, 132 are built in the same manner. The first and second part of the cotter 131, 132 provide an opening 135 and one or more convex cuts 133.

Figure 3:
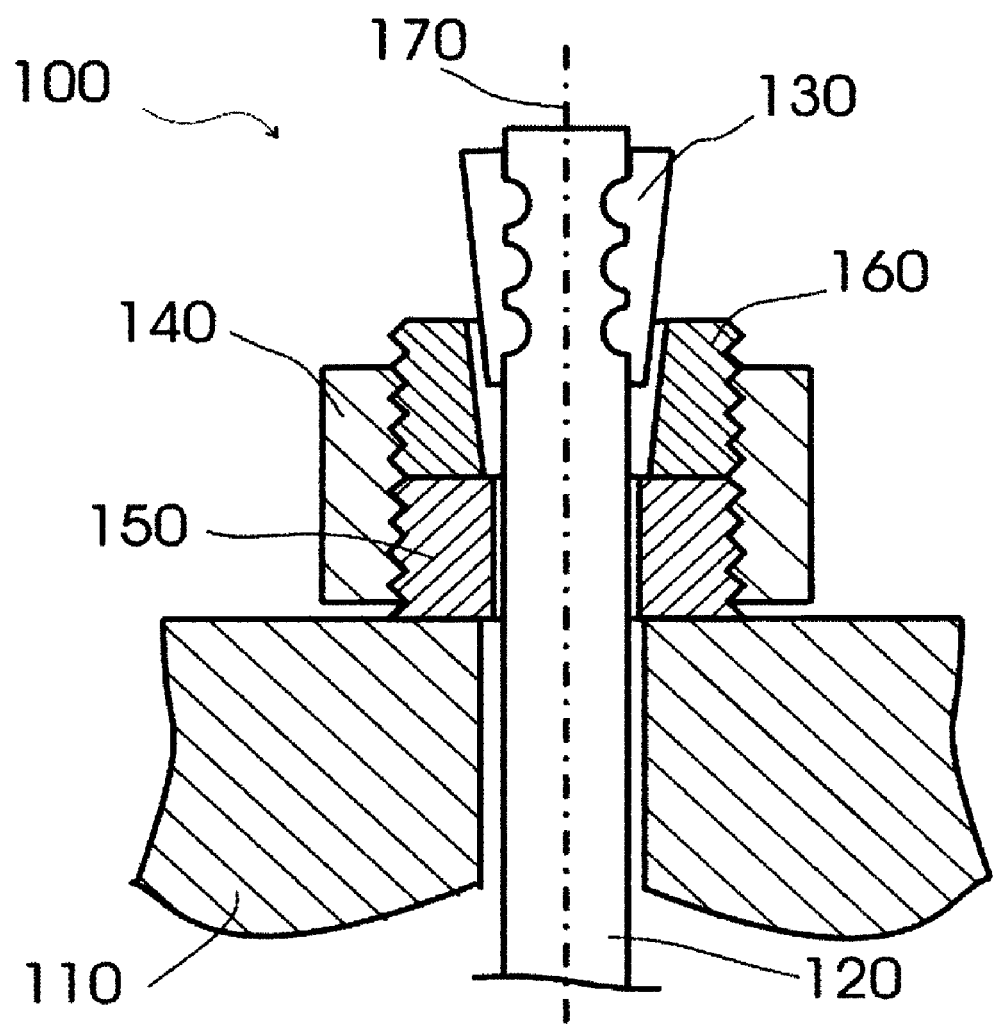
FIG. 3 shows a schematic view of a mounted connecting arrangement before fastening according to embodiments described herein.

A connecting system 300 according to embodiments described herein is shown in FIG. 3. The connecting system 300 shows the connecting arrangement 100 of FIG. 1 in a mounted manner in a sectional view before fastening the connecting system by the fastener 140.

The bolt is inserted in a component part 110, which may, for instance, be a flange. The support block 150 is placed around the bolt in a position below the fastening portion 121 of the bolt 120 in this embodiment. The second support block 160 is placed above the first support block 150, in the direction of a centre line 170 of bolt 120. Typically, the two parts of the cotter 131, 132 are placed around the bolt so that the convex cuts or protrusions 133 of the cotter 130 fit with the grooves 122 of the fastening portion 121 of the bolt 120. The fastener 140 surrounds the first and the second support block 150, 160.

Figure 4:
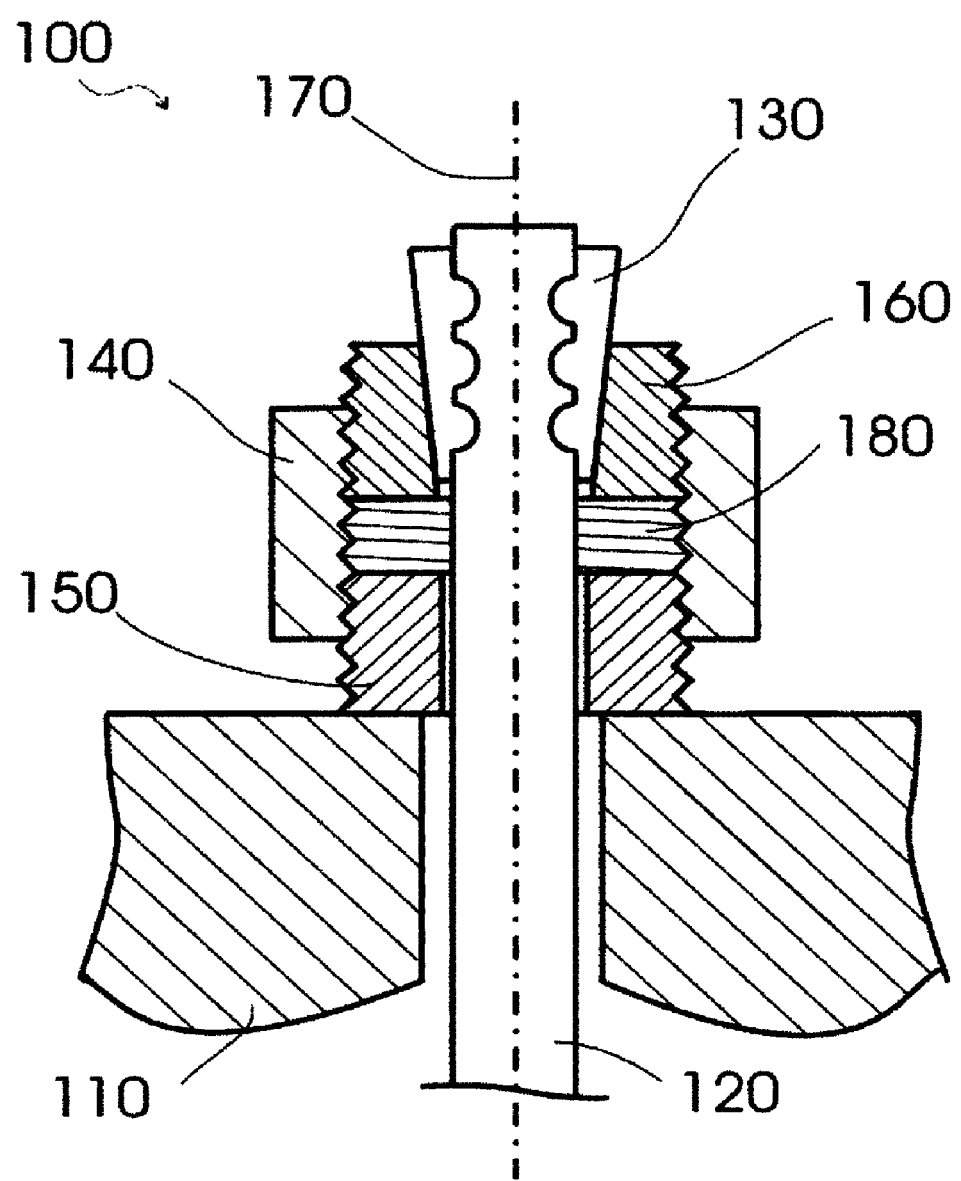
FIG. 4 shows a schematic view of a mounted connecting arrangement after fastening according to embodiments described herein.

FIG. 4 shows an embodiment of a mounted, fastened connecting arrangement 100. The fastener 140 is fastened by the thread on the inner side of the fastener 140 and the threads on the outer side of support blocks 150, 160.

By fastening the fastener 140, a form closure is provided between the fastening portion of the bolt 120 and the convex cuts 133 of the first and second part of the cotter 131, 132. According to embodiments described herein, the two support blocks 150, 160 have opposite directed threads so that the support blocks 150 and 160 disperse, when the fastener 140 is snugged down. When the support blocks 150, 160 disperse, one of the support blocks, typically the one with the conical shape on the inner side (support block 160 in FIG. 4), comes in contact with the cotter 130. By pressing the support block 160 to the cotter 130, the cotter 130 is pressed to the fastening portion 121 of the bolt 120. Especially, the convex cuts 133 of the cotter 130 are pressed into the grooves 122 of the fastening portion 121 of bolt 120. In this manner, the convex cuts 133 of the cotter 120 and the grooves 122 of the bolt 120 may form a form closure.

Further, a form closure is provided between fastener 140 and both support blocks 150 and 160. Due to the fact that the support blocks 150 and 160 provide opposite directed threads, a space 180 appears between the two support blocks 150 and 160, when the fastener 140 is snugged down. According to some embodiments described herein, the space 180 may be filled with cement, polymer, or any other substance suitable for these purposes.

According to some embodiments, the fastener may be snugged down by the movement of a rotor.

According to other embodiments, only one of the support blocks may be rotated and the other one may be fixed. In that case, the fastener 140 may chafe on the device 110 or a washer, which may be placed between the support block and the device 110. One of the support blocks can be denoted as locking block, as one of the blocks does not move and secures and holds the bolt in one embodiment.

Figure 5A:
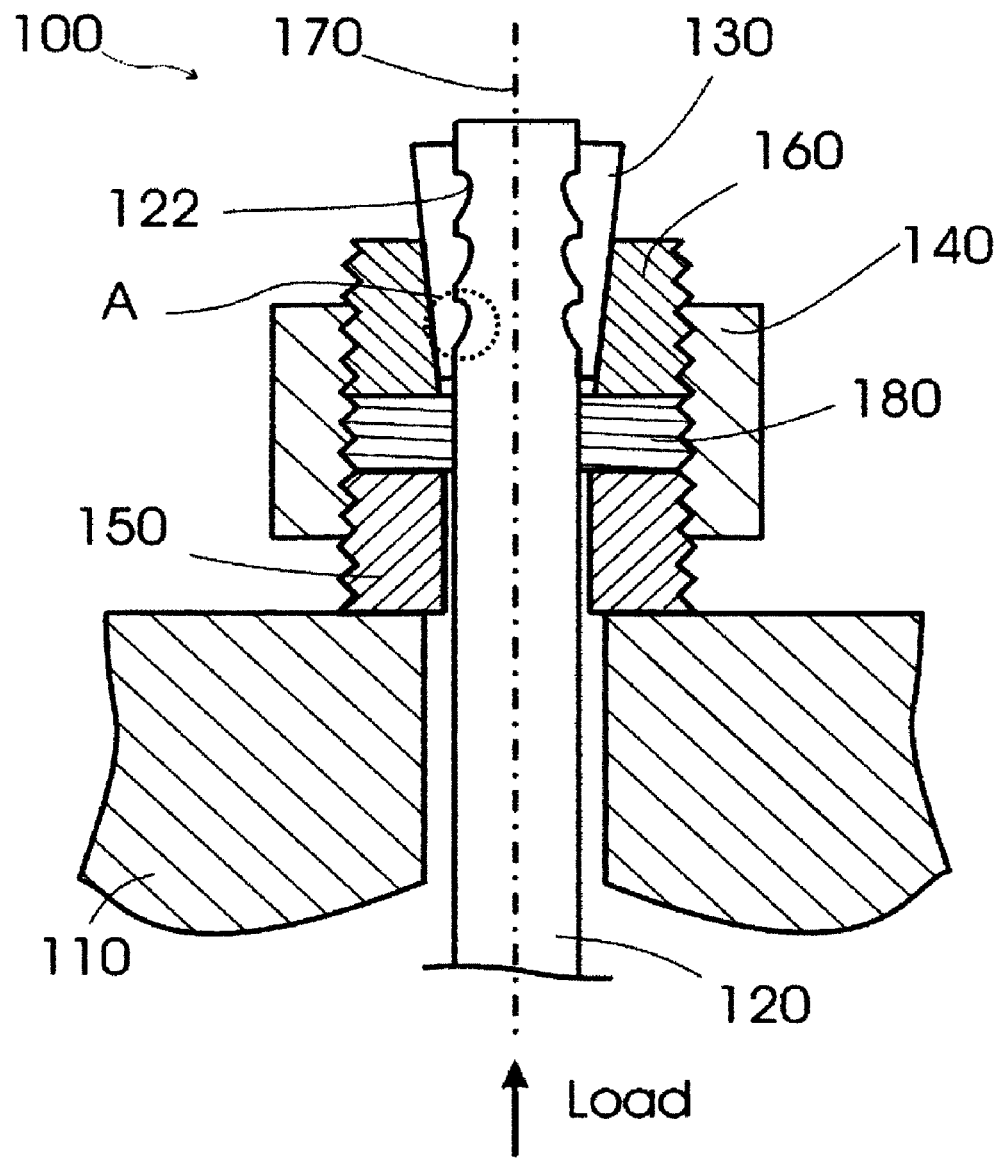
FIG. 5a shows a schematic view of a mounted connecting arrangement after fastening according to other embodiments described herein.
Figure 5B:
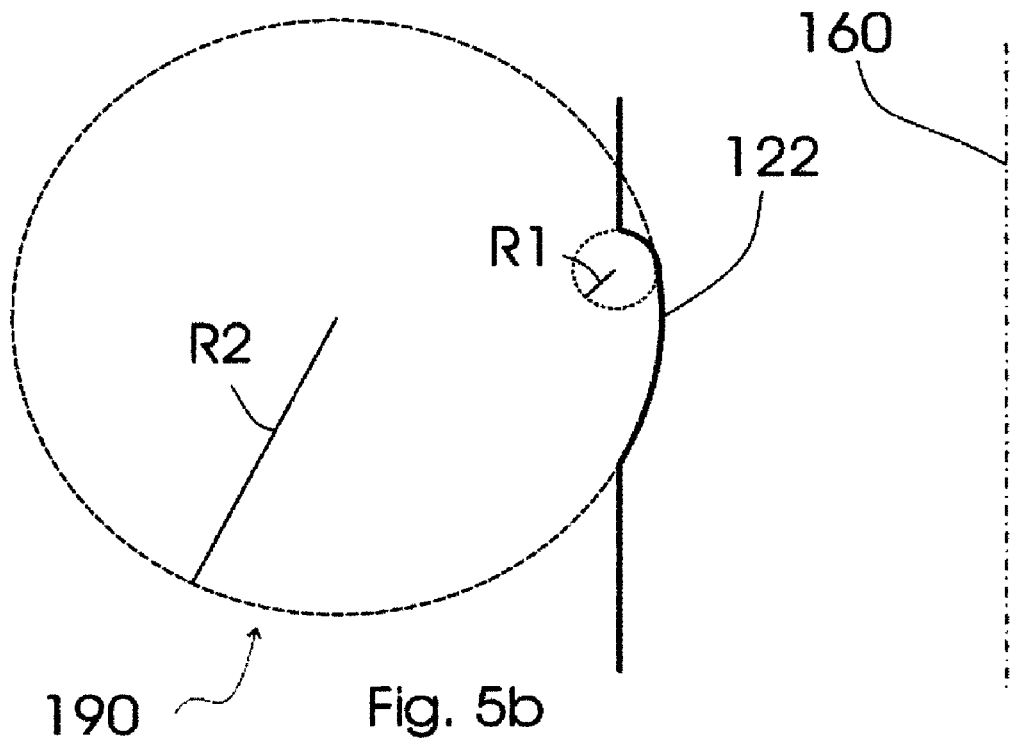
FIG. 5b shows a schematic, more detailed view of the geometry of a groove of a bolt according to some embodiments described herein; and, FIG. 6 shows a schematic flowchart of a method of fastening a bolt according to embodiments described herein.

FIG. 5a shows another embodiment of the connecting system. Grooves 122 of the bolt 120 provide a modified geometry in this embodiment. The groove accentuated in FIG. 5a by dashed circle A can be seen in more detail in FIG. 5b, where an axial, sectional view of a groove 122 along centre line 160 is shown. The geometry 190 of the grooves 122 has at least two different radii as can be seen in FIG. 5b. Two radii R1 and R2 are shown in FIG. 5b, defining the geometry 190 of the stress-relieved groove 133. According to some embodiments, the two radii are connected by a smooth intersection. For instance, the radii are connected so that the geometry is substantially continuously differentiable. Radius R1 is smaller than radius R2 in the embodiment of FIG. 5b. Thereby, the geometry 190 of the grooves 122 can be adapted to the load case in order to provide an even more secure application of the connecting arrangement. For instance, the grooves 122 may have the smaller radius in the direction, in which the load acts. In case, the load comes from the bolt 120 to the fastening portion 121 along the centre line 160, as shown in FIG. 5a, the greater radius comes first in that direction in order to provide a good result in connecting the device 110.

As can be seen in FIG. 5a, the construction of the cotter 130 is adapted for fitting with the modified geometry of the fastening portion 121 of the bolt 120. Typically, the convex cuts 133 of the cotter 130 have the same geometry as the grooves 122, but in an adverse manner so that the grooves 122 and the convex cuts can fit with one another.

According to some embodiments, the shape of the grooves may be modified in any manner, as long as the geometry of the grooves allows for a stress-relieved transmission of the load.

According to some further embodiments, the number of the grooves may be varied. The bolt is exemplarily shown with three grooves in the drawings. According to some embodiments, the number of grooves may be less or greater than three. For instance, the number of grooves may be two or just one. According to other embodiments, the number of grooves may be four, five, or even more than five.

The number of grooves and the shape of the grooves depend on the load case. The person skilled in the art will select the number and the shape of the grooves and the convex cuts dependent in order to assure a proper function and an improved fatigue behavior.

According to some embodiments, the bolt 120 may have a fastening portion at each end in order to fasten the bolt in each direction. The second fastening portion at the opposed end of the bolt may also have grooves with a stress-relieved geometry, as the grooves described above. Typically, the second fastening portion may have the same geometry and configuration as the first fastening portion.

Figure 6:
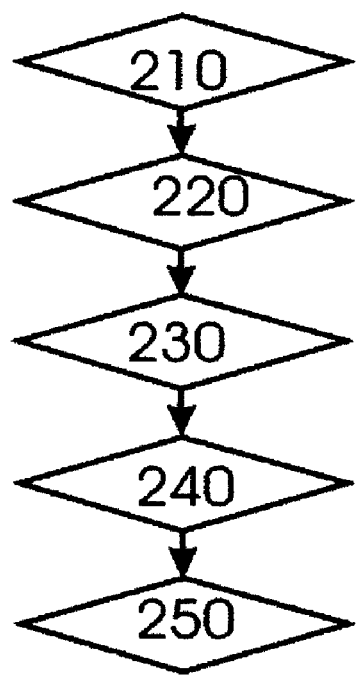

According to some embodiments, a method for fastening a bolt is provided. The method is shown in the flow chart of FIG. 6. The method includes in step 210 providing two parts to be connected, and inserting a bolt in a bore in these two parts in one embodiment. The bolt has a fastening portion with grooves as described above.

A holding portion of the bolt 120, which is substantially below the fastening portion of the bolt in direction of center line 170, is surrounded by at least two support blocks as described above in step 220 and 230. The holding portion of the bolt is surrounded by a first thread block having a thread on the outer side in step 220.

In step 230, the bolt is surrounded by a second thread block having a thread on the outer side and a conical shape on the inner side, which is adapted for fitting with the shape of a cotter.

In step 240, the fastening portion of the bolt is then surrounded by the cotter, which may, for instance, be a clamp component. According to some embodiments, the cotter may have two or more parts so that one half of the fastening portion of the bolt is firstly surrounded by the first part of the cotter, and then the other half of the fastening portion is surrounded by the second part of the cotter. The first and the second part of the cotter may be the first and the second part 131, 132, as described above and may further include all embodiments described thereof.

A fastener is provided in step 250. The fastener fits to the first and second support block and is able to provide a form closure between the support blocks and the fastener. By fastening the fastener in step 250, a further form closure is provided between the fastening portion of the bolt and the cotter. Thus, the bolt is fastened and can be held in a predetermined position.

By these form closures, the parts to be connected are connected by the bolt. Thereby, the bolt is clamped by the cotter and tightened by the fastener. In this manner, the bolt is prevented from moving and can hold the parts to be connected together.

According to some embodiments, the method may be used to fasten a flange connection. According to yet further embodiments, the method may be used in a wind energy system.

According to some embodiments, the method described above can be used to provide a connection, which reduces stresses due to the notch stress in a connecting arrangement. The reducing of the notch-effect may be provided by the number of grooves in the bolt or by the shape of the grooves of the bolt or by a combination thereof. The described method provides therefore a notch-stress depleted bolt.

Also, the tensile-shear load combination of a thread as known in the art can be changed into a press-shear load by the method and connecting arrangement according to embodiments described herein. The connecting system described above allows for increasing the fatigue resistance. Further, the embodiments described above can use known mounting methods for mounting the connecting system. For instance, the method and the connecting system allow for using known tightening methods for fastening the fastener. Moreover, the pre-tensions, which are used to ensure a proper function of the connection, may also be calculated by known methods. Therefore, new mounting or calculation methods have not to be applied for using the above system and method.

According to some embodiments, the above construction gives the possibility to use different materials for the bolt and the thread. For example, titan can be used instead of steel threads in case of very high loads. Thus, the dimensioning of the connecting arrangement can easily be adapted for every load case.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A connecting arrangement, comprising:
a bolt including a fastening portion including one or more grooves, whose circumference is differentiable between at least two portions;
a cotter including at least two parts and including an essentially conical shape on the outer side and a axial bore when the at least two parts are put together, wherein the axial bore provides one or more convex cuts on the inner side of the bore, wherein the convex cuts are adapted for fitting with the one or more grooves of the fastening portion of the bolt;
at least one first support block including a thread on the outer side;
at least one second support block including a thread on the outer side, wherein the at least one second support block is on the inner side adapted for fitting to the conical shape of the cotter; and
a fastener including a thread on the inner side, wherein the fastener is adapted for being screwed on the support blocks.

2. The connecting arrangement according to claim 1, wherein the fastener is a nut.

3. The connecting arrangement according to claim 2, wherein the thread of the nut is adapted for fitting the thread of the at least one first support block and the at least second support block.

4. The connecting arrangement according to claim 1, wherein the at least one first support block provides an oppositely directed thread compared to the thread of the at least one second support block.

5. The connecting arrangement according to claim 1, wherein one of the at least two support blocks is a locking block, which is adapted for locking the bolt in a defined position.

6. The connecting arrangement according to claim 1, wherein each of the one or more grooves has a geometry having at least two different radii.

7. The connecting arrangement according to claim 1, wherein the circumference of the one or more grooves is substantially continuously differentiable.

8. The connecting arrangement according to claim 1, wherein the connecting arrangement is a connecting device adapted for a flange connection.

9. The connecting arrangement according to claim 1, wherein the connecting arrangement is adapted for being used in a wind energy system.

10. A connecting system for a flange connection, comprising:
a bolt including a fastening portion at one end thereof adapted for fitting with a cotter, wherein the fastening portion includes one or more grooves adapted for providing a stress-relieved geometry;

a cotter adapted for clamping the bolt, wherein the cotter includes one or more protrusions on the inner side of the cotter and a conical shape on the outer side of the cotter, wherein the one or more protrusions are adapted for fitting with the one or more grooves of the fastening portion of the bolt;

at least one first thread block including a thread on the outer side;

at least one second thread block including a thread on the outer side and a conical shape on the inner side, wherein the inner side is adapted for fitting with the conical shape of the cotter; and a nut including a thread on the inner side, wherein the nut is adapted for being screwed on the at least first thread block by fitting with the thread on the outer side of the first thread block and being adapted for locking the at least one second thread block so that a form closure between the at least one first thread block and the cotter is provided.

11. The connecting system according to claim 10, wherein the thread of the second thread block is an opposing-handed thread compared to the thread of the at least one first thread block.

12. The connecting system according to claim 10, wherein each of the one or more grooves has a geometry having at least two different radii.

13. The connecting system according to claim 10, wherein the locked cotter and the fastening portion of the bolt provide a form closure.

14. The connecting system according to claim 10, wherein the geometry of the one or more grooves provides an improved load transmission through the bolt.

15. The connecting system according to claim 10, wherein the connecting system is adapted for fastening a flange connection in a wind energy system.

16. A method of fastening a bolt, comprising:
providing a bolt including a fastening portion at one end thereof, which includes one or more grooves and a holding portion;
surrounding the holding portion of the bolt with a first thread block including a thread on the outer side;
surrounding the bolt with a second thread block including a thread on the outer side and a conical shape on the inner side;
surrounding the fastening portion of the bolt including one or more grooves with a cotter including one or more convex cuts on the inner side of the cotter adapted for fitting with the one or more grooves of the fastening portion of the bolt; and
fastening the bolt, the first and the second thread block, and the cotter with a nut including a thread on the inner side adapted for matching the thread of the first and the second thread block.

17. The method according to claim 16, wherein the method is used to fasten a flange.

18. The method according to claim 16, wherein the bolt to be fastened is part of a wind energy system.

19. The method according to claim 16, wherein the first and the second thread blocks disperse, while fastening the bolt, the thread blocks, and the cotter by the nut.

20. The method according to claim 16, wherein the second thread block clamps the cotter and the bolt.

* * * * *